Patented Jan. 6, 1931

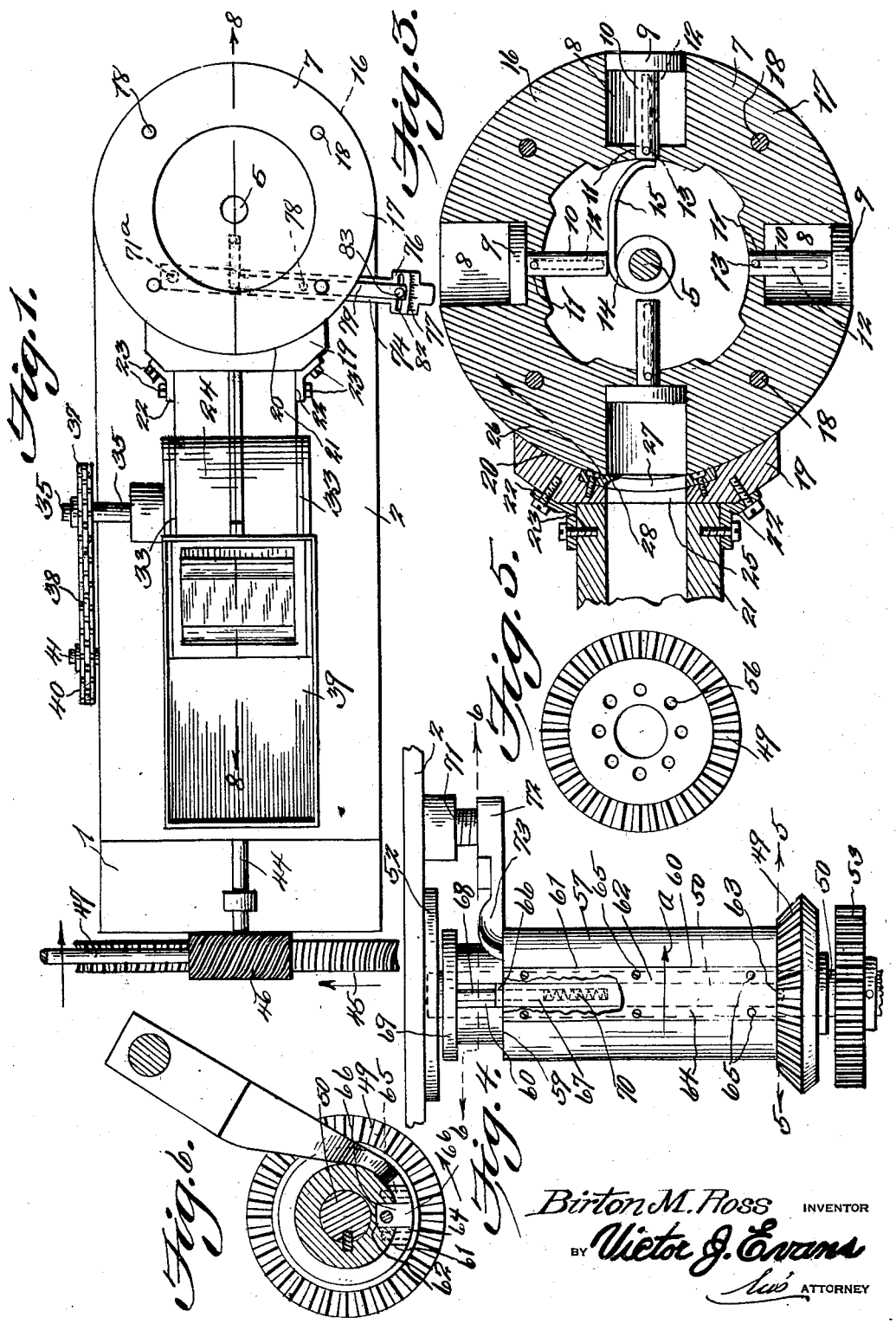

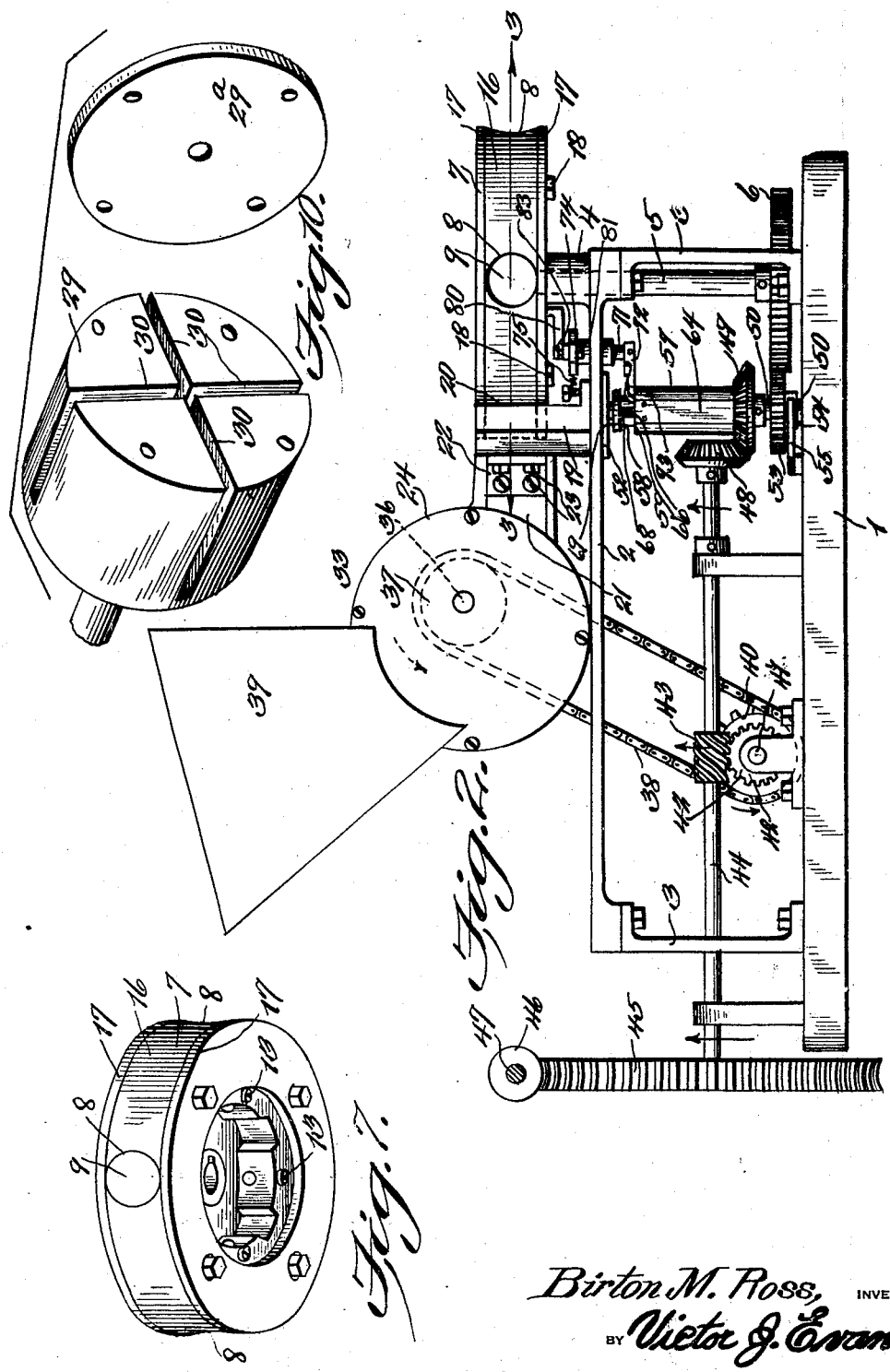

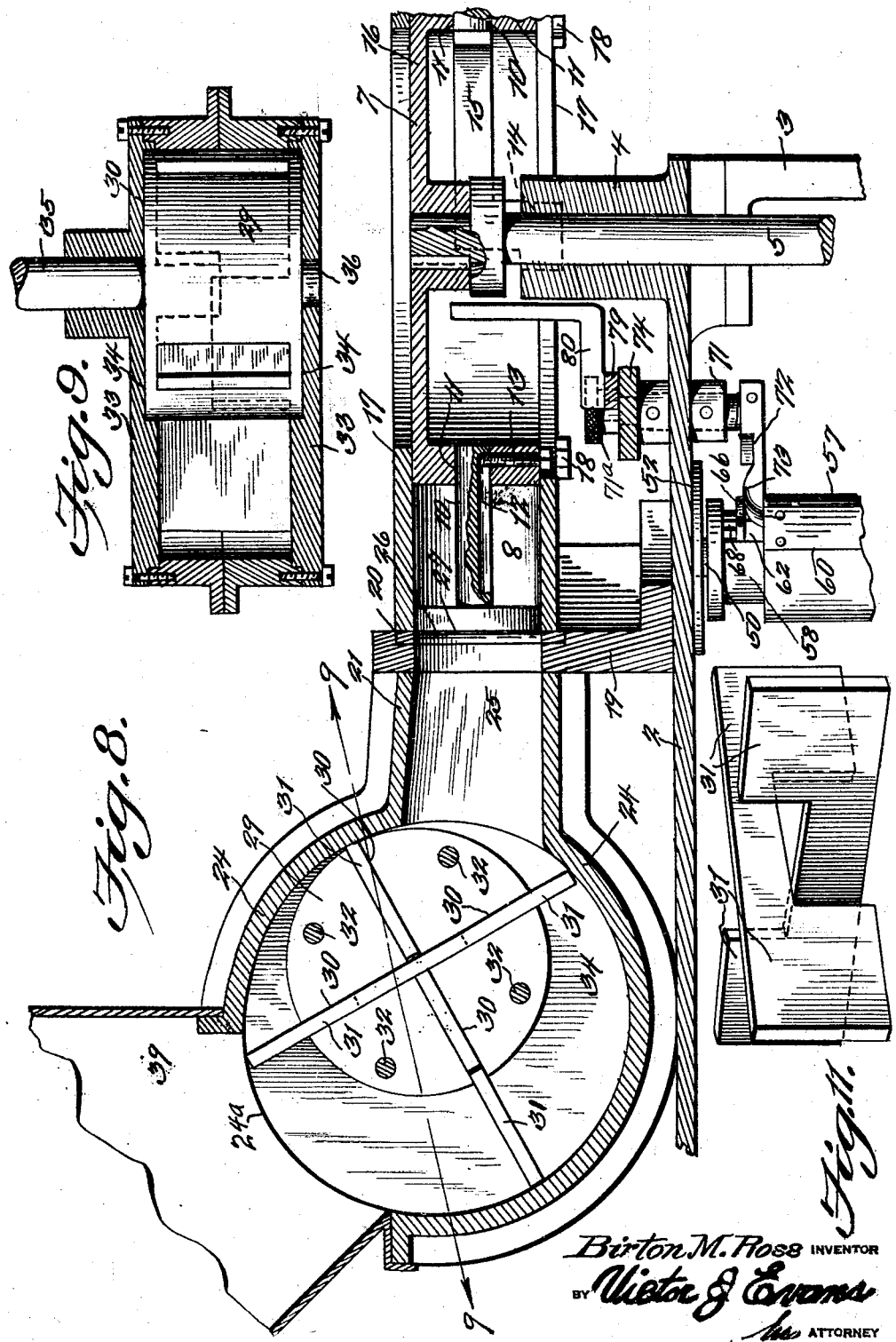

1,788,330

UNITED STATES PATENT OFFICE

BIRTON M. ROSS, OF GERMANTOWN, PHILADELPHIA, PENNSYLVANIA, ASSIGNOR OF ONE-HALF TO CHARLES PFLEGER, OF PHILADELPHIA, PENNSYLVANIA

DOUGH DIVIDING AND EXTRUDING MACHINE

Application filed January 9, 1928. Serial No. 245,479.

The present invention relates to an improved machine for handling bread and cake dough, especially adapted for dividing the dough and extruding it in varying sizes of deposits, for making rolls, biscuits, doughnuts and the like.

The invention has for its purpose to provide a machine of this character, wherein the dough may be fed into a hopper, divided into requisite quantities, and then extruded through a passage, and finally into biscuit, roll or doughnut forming chambers of a rotating head, and from which such deposits of dough are automatically discharged, the mechanism for dividing the dough and rotating the head having the biscuit or roll forming chambers, including means for operating them synchronously and coordinately. However, the head with the dough receiving chambers for forming rolls or biscuits receives an intermittent motion co-ordinately with the dividing feed of the dough.

Another purpose is to provide, in a machine of this kind, a mechanism for intermittently detaining the head with the dough receiving chambers, whereby each chamber may be registered with the outlet of the dough extruding passage, so that the requisite amount of dough may be extruded into the chamber, in conjunction with means for permitting a clutch to take hold and impart revoluble movement to a gear on a shaft which carries the rotating head having the chambers, allowing the head to be moved to bring another chamber in register with the dough extruding passage, there being means for disengaging the clutch, allowing the head to remain with its chamber in register with said passage, until the next chamber is filled, the mechanism being so arranged that the clutch may again take hold and thereby permit the machine to repeat these operations.

Another purpose is to provide means for gauging the amount of dough to enter the chambers as they intermittently register with the extruding passage, there being a graduating scale for indicating the amount of dough entering the chamber.

A further purpose is to provide discharging means in the chambers for discharging the dough deposits, said discharging means to be set to gauge the size of the deposits, so as to produce varying sizes of biscuits, rolls, doughnuts and the like.

A still further purpose is to provide an improved dough dividing and extruding feed to continuously rotate and including intersecting dough dividing blades which are carried by a rotor operable in the main dough receiving chamber, said blades having an extruding feed action at the same time the dough is divided, so as to feed the dough through the passage in order that it may be extruded into the dough receiving chambers of the head, said casing having guides for the intersecting blades, so as to retain them in their proper positions.

It is to be understood that the particulars herein given are in no way limitive, and that while still keeping within the scope of the invention, any desired modification of details and proportions may be made in the construction of the device according to circumstances.

The invention comprises further features and combination of parts to be hereinafter set forth, shown in the drawings and claimed.

In the drawings:—

Figure 1— is a plan view of the improved dough dividing and extruding machine constructed in accordance with the invention.

Figure 2— is a view in side elevation of the same showing the mechanism for operating the dividing and extruding means and the head which have the dough receiving chambers.

Figure 3— is a sectional view on line 3—3 of Figure 2.

Figure 4— is an enlarged detail view of the clutch mechanism to provide for intermittent connections between the driving mechanism and the rotating means which carries the intermittently revolving head.

Figure 5— is a plan view of the gear 49.

Figure 6— is a sectional view on line 6—6 of Figure 4.

Figure 7 is a detail perspective view of the rotating head having the dough receiving chambers.

Figure 8— is a sectional view on line 8—8 of Figure 1, more clearly showing the construction of the rotating head and its chambers, including the discharging plungers, and showing a casing which receives the dough and wherein it is divided in substantially requisite amounts and from which it is extruded through the medium of the dividing means.

Figure 9— is a sectional view on line 9—9 of Figure 8.

Figure 10— is a detail view of the rotor of the dividing and extruding means.

Figure 11— is a detail view of the intersecting dough dividing blades.

Referring to the drawings—1 identifies a base, and mounted upon the base is a frame 2, which includes the legs 3. One end of the frame has a boss 4, which and a part of the frame 2 at its end constitutes a bearing having a shaft 5, the lower end of which has a bearing in the base 1 and carries a spur gear 6. The upper end of the shaft 5 has secured thereto an intermittently revoluble head 7 which has a plurality of dough receiving chambers 8. The chambers are radially arranged and operable therein are plungers 9, which have stems 10 guided in the bottom walls of the chambers 8 as identified at 11. The stems 10 have longitudinal grooves 12, shown in dotted lines in Figure 3, there being set screws or pins 13 extending transversely of the bottom walls of said chambers with their extremities engaged within the grooves 12 to guide and retain the stems against rotary displacement. The stems 10 are radially positioned relative to the head 7, and as shown in Figure 8 the under part of the head 7 is chambered out, so that when the plungers 9 are disposed adjacent the bottom walls of the chambers 8, the stems are positioned or extended into the chambered out part of the head.

The boss 4 has secured thereto by means of welding or a pin or the like as at 14, a cam tongue 15, to be engaged by the ends of the stems 10, to actuate them and force the plungers outwardly of the chambers 8 for the purpose of discharging the dough deposits, according to the size of biscuits, rolls or doughnuts as may be desired.

This head 7 comprises a body 16 and opposite plates 17, the latter being secured to the body 16 by means of bolts 18 as shown clearly in Figures 2 and 3.

Mounted upon the frame 2 in any approved manner is an upstanding wall 19, which has an arcuate face 20 concentric with the head 7, and in which the cylindrical surface of the head engages, as the latter rotates intermittently.

A casting 21 is secured to the upstanding wall 19 by means of angle plates 22, which are secured by screws or the like 23 to the casting, and the wall, as shown in Figures 1, 2 and 3. This casting 21 merges into a cylindrical casing 24, the interior of the casing communicating with a passage 25 formed in the casting 21. The passage 25 in the casting 21 also registers with an opening in the wall 19, and where this register takes place an arcuate plate 26 is countersunk in the curved face of the wall 19, and with which the cylindrical face of the head 7 engages. The plate 26 has an opening 27, which registers with the several chambers of the head 7, and one edge of the opening 27 of the plate is extended toward the centre of the opening 27 and sharpened, acting to shear the dough off after it enters the roll or biscuit forming chamber, said extended and sharpened portion of the edge of the opening being designated by the numeral 28, as in Figure 3.

Eccentrically in the casing 24 is a cylindrical body member 29 provided with intersecting radial slots 30, in which are guided intersecting dough dividing and feeding blades 31, which not only act to divide the dough but also feed and cause an extruding action to take place. In order that the blades may intersect, their central portions are cut away as shown in Figure 12, said cutaway portion of one blade straddling the corresponding portion of the other blade and vice versa.

As previously stated the blades 31 are cut away to permit them to intersect each other, and are mounted in the radial slots 30 of the cylindrical body member 29. This body member is eccentrically mounted in the casing 24, and the position it assumes necessitates the casing 24 to be swelled at a portion thereof identified by the reference character 24a, in order to permit the blades 31 to reciprocate across the diameter of the cylindrical body member 29. When each blade 31 assumes a position, which is assumed by one of the blades in Figure 8 extending on an incline toward the left, it is necessary that the wall of the casing 24 must be swelled at the point 24a, in order to permit the blade to move with the cylindrical body member 29. Unless such a swell is provided, the blades, during their actions would jam or bind, and thereby render the machine inoperative. A plate is secured by screws 32 to the cylindrical body member 29, for the purpose of retaining the blades in the slots. The casing 24 has opposite head plates 33, which have circular depressions 34, which are arranged eccentrically of the casing 24. The depressions 34 receive the opposite faces of the cylindrical body member 29, which is capable of revoluble movement, due to the fact that one face of the body member 29 has an integral shaft 35, and the plate on the opposite face of the body member has a stub shaft 36. The shaft 35 and the stub shaft 36 are in bearings of the head plates 33 of the casing 34, and one end of the shaft 35 carries a sprocket 37, with which a sprocket chain 38 engages. The casing 24 is provided with a suitable hopper 39 into which the dough to be divided and extruded is fed. As the dough enters the hopper 39 it is picked up by the blades 31, the blades acting to divide the dough in requisite quantities and feed it into the passage 25 of the casing 21.

The sprocket chain 38 engages a sprocket 40 carried by a shaft 41, which is mounted in the bearings on the base 1. The shaft 41 has a worm wheel 42, which meshes with a worm 43 carried by a shaft 44, which in turn is mounted in bearings on the base 1. The shaft 44 extends at right angles to the shaft 41 and one of its ends carries a worm wheel 45, with which a worm 46 meshes, the latter being carried by a shaft 47, which may receive power from any suitable source not shown, preferably a motor.

The other end of the shaft 44 carries a beveled gear 48 which meshes with a smaller gear 49 on a shaft 50, which is mounted in a bearing of the base 1. The upper end of the shaft 50 is mounted in a bearing of a plate 52 secured to the under face of the frame 2. The shaft 50 carries a gear 53 which meshes with the spur gear 6, and on the lower part of the shaft 50 is a rectangular collar 54, with which a leaf spring 55 engages. The faces of this rectangular collar 54 are positioned coincident to the chambers 8, so that when the shaft 50 is rotated the spring 55 will engage with one of the faces and retain the head 7 with one of its chambers 8 in register with the opening 27 of the plate 26, so that the dough may easily feed into the chamber registering with said passage.

The beveled gear 49 is loose upon the shaft 50, and is provided with a plurality of small cavities or depressions 56. A suitable sleeve 57 is keyed to the shaft 50 as shown in Figure 6, and the upper end of the sleeve is reduced as identified at 58, thereby causing the shoulder 59 to be formed. This sleeve has a longitudinal vertically arranged slot 60, which is counter-slotted as at 61. Mounted in the slot 60 is a clutch strip 62, with a lug 63 on its lower end, and which is designed to enter in one of the depressions or cavities 56 of the loosely mounted gear 49, so as to pick up the gear and cause it to rotate in the direction of the arrow "a" in Figure 4. A cover plate 64 is secured in the counter-slot 61 by means of screws 65, to retain the clutch strip 62 in the slot 60. The upper end of the clutch strip has a lateral lug 66 and is provided with a cylindrical bore 67, which receives a downwardly projecting guide pin 68 depending from the collar 69 of the sleeve 57, there being a spring 70 between the lower end of the depending pin 68 and the bottom of the bore, thereby acting to force the clutch strip downwardly in the direction of the loose gear 49.

Depending from the frame 2 and secured therein in any approved manner is a stud 71 carrying a lever 72 which has a cam 73 at one end. The cam carrying end of the lever 72 rides upon the shoulder 59 of the sleeve 57 just in the path of the lateral lug 66, so that when the sleeve 57 rotates in the direction of the arrow "a", the lug may ride up upon the cam 73 at the same time the spring 55 engages one of the flat places of the rectangular collar 54 on the shaft 50, until the clutch strip 64 again picks up the loose gear 49 and imparts further movement thereto.

The stud 71 is rotatable in the frame 2, and its upper end carries at 71a a lever 74, which is under tension of a spring 75, to retain the cam end of the lever 72 against the side of the sleeve 57. The lever 74 has a sector 76 at its outer end, and upon the upper face of which a graduated scale 77 is provided. Pivoted at 78 on the lever 74 is a gauge member 79 having at its inner end an upstanding lug 80, and its outer end carrying a bolt 81, which extends through a slot 82 in the lever 74, the head of the bolt engaging beneath the lever 74, while threaded to its shank is a thumb nut 83.

The upstanding lug 80 is positioned adjacent the shaft 5 at its upper end just in the path of the stems 10 of the plungers 9, acting to limit the stems in their movement radially of the head 7. It is possible to release the thumb nut 83 and set the gauge member 79, and again tighten the thumb nut 83, so as to position the upstanding lug 80 at different locations, for limiting the inward lateral movement of the stems, and thereby govern the positions of the plungers 9.

When the dough enters the chamber 8, it pushes the plunger 9 inwardly, until the stem is limited in its inward movement, the plunger likewise being limited, so that only a certain quantity of dough may enter the chamber 8. When the lug 80 is positioned substantially close to the shaft 5, it is possible for the stems 10 to move to their limit radially inwardly, and in which case the plungers 9 are engaged with the bottoms of the chambers 8.

In the operation the gauge member 79 is positioned to gauge the amount of dough to enter the chamber 8, and then the lever 74 is moved, and thereby moving the lever 72, disengaging the cam 73 from under the lateral lug 66, allowing the clutch strip to move downwardly until its lug 63 engages one of the depressions 56.

As soon as the lug engages a depression 56, the loosely mounted gear 49 is picked up and rotated with the shaft 50, and since the shaft has a gear 53 meshing with the spur gear 6, the head 7 rotates, until a chamber 8 is filled with dough, and its diametrically opposite chamber has discharged a dough deposit, through the medium of the stem of a plunger 9 engaging with a cam tongue 15. The shaft 50 makes a complete revolution, until the lateral lug 66 returns to a position engaged upon the top of the cam 73. These operations are consecutively repeated, it being understood that the lever 74 is to be manipulated to release the clutch strip from its raised position. As previously stated, the shaft 41 carries power to the shaft 35 and the rotor 29, so as to cause movement to be imparted to the blades, which will act to divide and extrude the dough into the passage 25, from which it may enter the chambers 8 of the head 7.

The invention having been set forth, what is claimed is:

1. In a dough dividing and extruding machine, the combination with a frame, of a head on one end of the frame provided with a plurality of dough receiving chambers, pistons including plungers guided in the chambers, means for feeding dough into said chambers, a vertical shaft mounted in bearings of the frame and rotatably carrying said head, a driving mechanism for the feeding means, said driving mechanism including a shaft, a vertical shaft having a loose gear operatively connected to the shaft of the driving mechanism and in turn operatively connected to the shaft carrying the head, a stud rockable in a bearing of the frame, a lever on the lower end of the stud and having a cam, and means carried by the vertical shaft and supported out of engagement with the loose gear by the cam on the lever, and adapted to engage automatically with the loose gear through operation of said lever for intermittently rotating the head.

2. In a dough dividing and extruding machine, the combination with a frame, of a head on one end of the frame provided with a plurality of dough receiving chambers, pistons including plungers guided in the chambers, means for feeding dough into said chambers, a vertical shaft mounted in bearings of the frame and rotatably carrying said head, a driving mechanism for the feeding means, said driving mechanism including a shaft, a vertical shaft having a loose gear operatively connected to the shaft of the driving mechanism and in turn operatively connected to the shaft carrying the head, a stud rockable in a bearing of the frame, a lever on the lower end of the stud and having a cam, and means carried by the vertical shaft and supported out of engagement with the loose gear by the cam on the lever, and adapted to engage automatically with the loose gear through the medium of the operation of said lever for intermittently rotating the head, a lever on the upper end of the stud, and a gauge device carried by the lever on the upper end of the stud, said gauge device having an arm extending up into and under the head for limiting the plunger for gauging the amount of dough entering each chamber.

3. A dough dividing and extruding machine for forming biscuits, rolls and the like, a frame, a shaft in bearings at one end of the frame, a head on the upper end of the shaft and rotatable therewith, the head being chambered out underneath and centrally and provided with a plurality of dough receiving chambers opening at the periphery of the head, plunger rods guided in bearings at the inner ends of the chambers and carrying pistons, means for feeding divided portions of dough into the chambers against the pistons, a rocking stud in bearings of the frame, a lever movable with the stud at its upper end, a gauge device on said lever and having an arm extending up into and under the head and in the path of the plunger rods, said gauge device adapted to be set, whereby the upstanding arm may be set in different positions for limiting the travel of the plunger rods, for gauging the amount of dough to be fed into the chambers, means for operating the feeding means, a mechanism connecting the operating means and the shaft, and including an operative element on the lower end of the stud for intermittently and automatically actuating the shaft carrying the head.

4. A dough dividing and extruding machine for forming biscuits, rolls and the like, a frame, a shaft in bearings at one end of the frame, a head on the upper end of the shaft and rotatable therewith, the head being chambered out underneath and centrally and provided with a plurality of dough receiving chambers opening at the periphery of the head, plunger rods guided in bearings at the inner ends of the chambers and carrying pistons, means for feeding divided portions of dough into the chambers against the pistons, a rocking stud in bearings of the frame, a lever movable with the stud at its upper end, a gauge device on said lever and having an arm extending up into and under the head and in the path of the plunger rods, said gauge device adapted to be set, whereby the upstanding arm may be set in different positions for limiting the travel of the plunger rods, for gauging the amount of dough to be fed into the chambers, and means for transmitting power to the feeding means and intermittently actuating said shaft.

In testimony whereof he affixes his signature hereto.

BIRTON M. ROSS.